(12) United States Patent
Friedrich et al.

(10) Patent No.: US 9,033,307 B2
(45) Date of Patent: May 19, 2015

(54) VALVE FOR LAB-ON-A-CHIP SYSTEMS, METHOD FOR ACTUATING AND FOR PRODUCING VALVE

(75) Inventors: Katja Friedrich, Nürnberg (DE); Walter Gumbrecht, Herzogenaurach (DE); Peter Paulicka, Röttenbach (DE)

(73) Assignee: Boehringer Ingelheim Vetmedica GmbH, Ingelheim am Rhein (DE)

( * ) Notice: Subject to any disclaimer, the term of this patent is extended or adjusted under 35 U.S.C. 154(b) by 660 days.

(21) Appl. No.: 13/375,200

(22) PCT Filed: Apr. 29, 2010

(86) PCT No.: PCT/EP2010/055822
§ 371 (c)(1),
(2), (4) Date: Nov. 29, 2011

(87) PCT Pub. No.: WO2010/136299
PCT Pub. Date: Dec. 2, 2010

(65) Prior Publication Data
US 2012/0090692 A1    Apr. 19, 2012

(30) Foreign Application Priority Data
May 29, 2009   (DE) .......................... 10 2009 023 429

(51) Int. Cl.
*F16K 3/28*    (2006.01)
*F16K 7/20*    (2006.01)
(Continued)

(52) U.S. Cl.
CPC .............. *F16K 99/0001* (2013.01); *F16K 7/20* (2013.01); *B01L 3/5027* (2013.01);
(Continued)

(58) Field of Classification Search
CPC ....... B81B 2201/054; F16K 3/28; F16K 7/00; F16K 99/0001; F16K 7/20; F16K 99/0026; F16K 2099/0078; B01L 3/5027; B01L 2200/10; B01L 2300/0816; B01L 2300/0887; B01L 2400/0655
USPC ............... 137/903, 14; 251/57, 61, 61.1, 214, 251/334, 335.1, 356, 358; 277/308, 327, 277/366, 377, 401; 422/537
See application file for complete search history.

(56) References Cited

U.S. PATENT DOCUMENTS 3,095,904 A  *  7/1963  Thaning ................... 137/625.28
3,336,843 A  *  8/1967  Griswold ........................ 92/100
(Continued)

FOREIGN PATENT DOCUMENTS

CH          457 063        5/1968
DE       199 49 912 A1     5/2001
(Continued)

OTHER PUBLICATIONS

JP 2006283965 Translation (machine), Yukimitsu et al., published Oct. 19, 2006.*
(Continued)

*Primary Examiner* — Craig Schneider
*Assistant Examiner* — Frederick D Soski
(74) *Attorney, Agent, or Firm* — Roberts Mlotkowski Safran & Cole, P.C.; David S. Safran

(57) ABSTRACT

A substrate of a lab-on-a-chip system has two adjacent recesses, one serving as a flow channel and the other one being filled with an elastomer compound. In a first state, the elastomer compound and the substrate delimit the flow channel in a section. In a second state, the elastomer compound takes up the space in the recess in the substrate along a cross-section of the flow channel, thereby completely closing the flow channel. The substrate and the elastomer compound may be produced by injection molding techniques.

15 Claims, 2 Drawing Sheets

(51) Int. Cl.
  *B01L 99/00* (2010.01)
  *F16K 99/00* (2006.01)
  *B01L 3/00* (2006.01)

(52) U.S. Cl.
  CPC ..... *B01L 2200/10* (2013.01); *B01L 2300/0816* (2013.01); *B01L 2300/0887* (2013.01); *B01L 2400/0655* (2013.01); *F16K 99/0026* (2013.01); *F16K 2099/0078* (2013.01); *F16K 2099/0084* (2013.01)

(56) References Cited

U.S. PATENT DOCUMENTS

| | | | | |
|---|---|---|---|---|
| 3,408,042 | A | * | 10/1968 | Vorkoeper ............... 251/334 |
| 3,457,950 | A | * | 7/1969 | Over ............... 137/546 |
| 3,598,364 | A | * | 8/1971 | Grenier ............... 251/179 |
| 3,905,689 | A | * | 9/1975 | Mylander ............... 251/77 |
| 3,980,343 | A | * | 9/1976 | Stelzer ............... 303/9.68 |
| 4,601,881 | A | | 7/1986 | Webster |
| 5,573,033 | A | | 11/1996 | Litzel |
| 6,089,543 | A | * | 7/2000 | Freerks ............... 251/357 |
| 7,104,517 | B1 | | 9/2006 | Derand et al. |
| 7,601,270 | B1 | | 10/2009 | Unger et al. |
| 2002/0166585 | A1 | | 11/2002 | O'Connor et al. |
| 2009/0007969 | A1 | | 1/2009 | Gundel |

FOREIGN PATENT DOCUMENTS

| | | |
|---|---|---|
| DE | 600 00 109 T2 | 11/2002 |
| DE | 600 07 128 T2 | 9/2004 |
| DE | 102009023429.2 | 5/2009 |
| EP | 0 180 064 B1 | 6/1991 |
| EP | 0 688 988 A2 | 12/1995 |
| EP | 1 905 514 A1 | 4/2008 |
| JP | 41-3739 | 2/1966 |
| JP | 2006-283965 | 10/2006 |
| WO | 2006/132666 A1 | 12/2006 |
| WO | 2010/031559 A1 | 3/2010 |

OTHER PUBLICATIONS

Notice of Allowance mailed Feb. 18, 2014 in corresponding Japanese Application No. 2012-512290.

Office Action issued Jul. 2, 2013 in corresponding Japanese Application No. 2012-512290.

International Search Report for PCT/EP2010/055822; mailed Sep. 16, 2010.

* cited by examiner

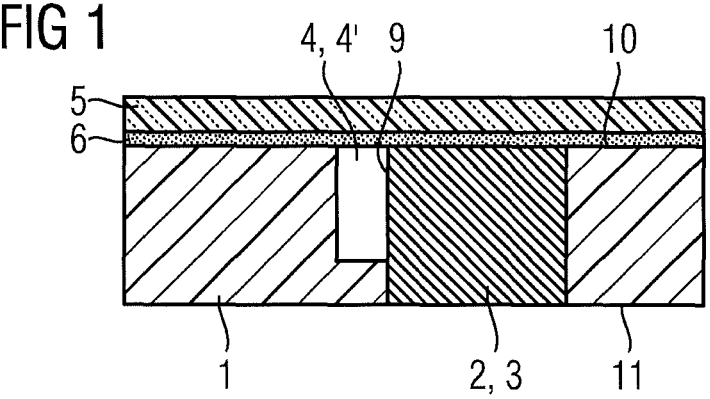
FIG 1
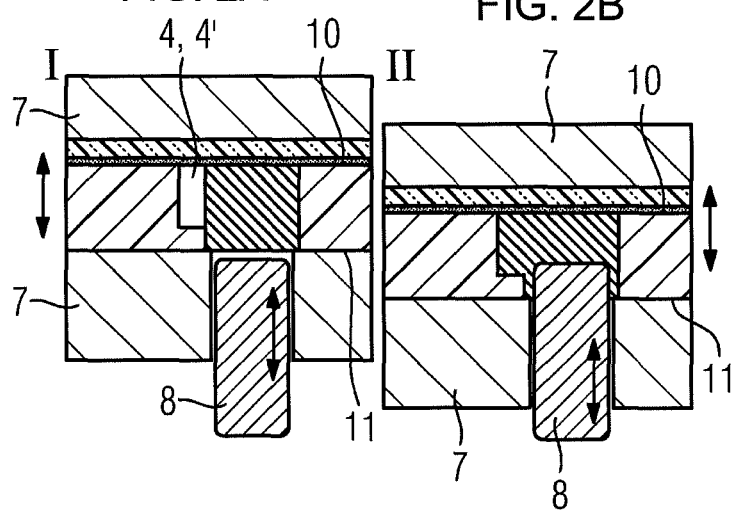
FIG. 2A
FIG. 2B

FIG. 3B
FIG. 3A
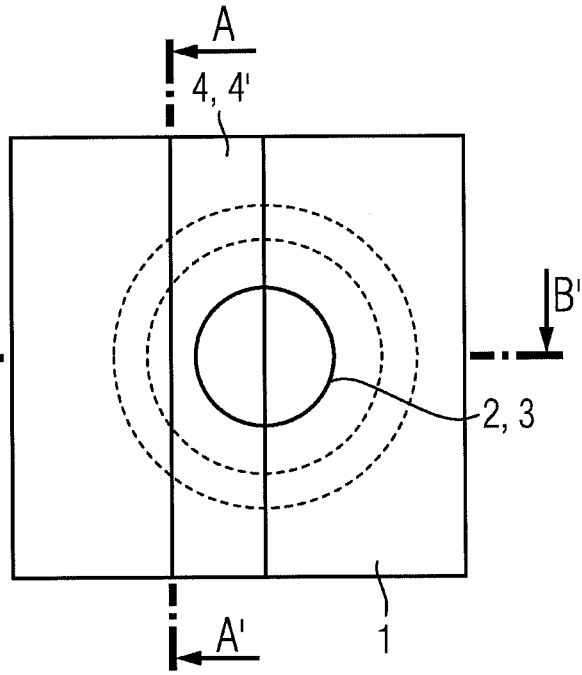
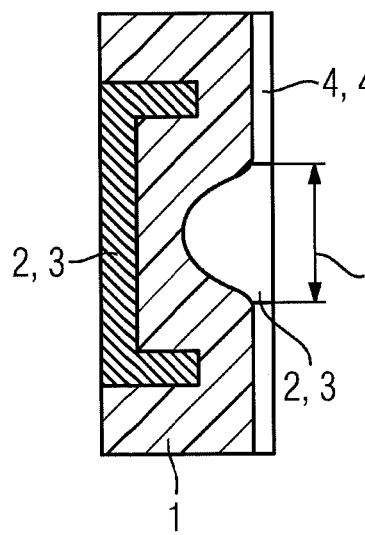
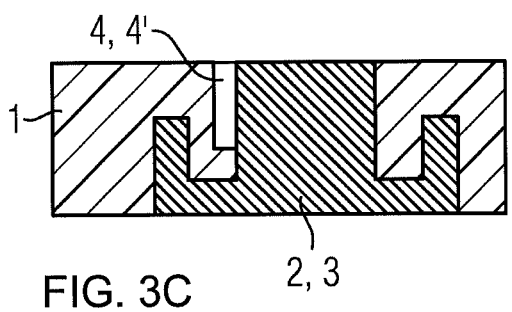
FIG. 3C

VALVE FOR LAB-ON-A-CHIP SYSTEMS, METHOD FOR ACTUATING AND FOR PRODUCING VALVE

CROSS REFERENCE TO RELATED APPLICATIONS

This application is the U.S. national stage of International Application No. PCT/EP2010/055822, filed Apr. 29, 2010 and claims the benefit thereof. The International Application claims the benefits of German Application No. 102009023429.2 filed on May 29, 2009, both applications are incorporated by reference herein in their entirety.

BACKGROUND

Described below is a valve for opening and closing a flow channel in a lab-on-a-chip system The valve is defined by a support body which has at least one first recess in the form of a flow channel and has a second recess directly next to a subregion of the first recess, as is known for example from EP 0 180 064 B1.

In biosensor technology, lab-on-a-chip systems are used in order to be able to carry out biochemical analyses in parallel. Microfluidic instruments and a chip having an array of sensors are integrated on a support, which may be, for example, a plastic card. The array of sensors may be, for example, electrochemical sensors which are arranged in columns and rows on the chip. The sensors are coated with molecules, to which the substances to be detected bind specifically. The specific binding is detected electrochemically by changes in current and/or voltage. In this way biochemical substances, for example antibodies, peptides or DNA, can be detected in solutions to be examined, for example blood or urine.

The measured electrochemical signals may be processed directly by integrated circuits on the chip, or they may be read out from the chip by an external evaluation unit. The chemicals required for the examination may be delivered from the external evaluation unit to the support or they may already be on the support, for example in the form of dry reagents. During the examination, the solutions, i.e. liquids, are delivered to the support and fed on the support via microchannels into a reaction chamber. The chip with the sensor array is located in the reaction chamber.

Reactions required for the detection may take place in the microchannels and/or the reaction chamber.

In the case of complex biochemical reactions which are required for the detection, the fluid flow of the solution must be controlled. For instance, it may be necessary for the liquid to stay for a predetermined period of time in a region of the microchannels, so that for example dry reagents which are stored in this region are dissolved and chemical reactions take place. Only after completion of the chemical reactions is the liquid fed further through the microchannel. Furthermore, when detecting biochemical substances in the reaction chamber it may be necessary to close the reaction chamber in a fluid-tight fashion. To this end, valves are to be provided in the support. They are to be arranged at particular selected positions in the support, for example in the inlet and outlet of the reaction chamber.

EP 0 180 064 B1 discloses valves, which are designed to close microchannels. The microchannels are arranged in a first support, which is covered with a thin membrane on the side of the microchannels. The thin membrane is arranged in a sandwich fashion between the first support and a second support. Arranged in the second support, there are plunger-like instruments which can be pressed with the aid of springs via the membrane onto openings of the microchannels in the first support. The microchannels are thereby closed by the membrane. The described valves include a number of individual parts and can only be formed by a system having at least two supports and a membrane. The multiplicity of parts leads to problems with the reliability and leaktightness of these valves. Furthermore, a structure of at least two supports leads to high production costs and elaborate alignment of the plunger-like instruments in the second support over the openings of the microchannels of the first support.

SUMMARY

It is therefore described below are valves having a simple and economical structure, which reliably close microchannels in a liquid-tight fashion and methods which allow simple actuation of the valves without elaborate alignment and provide an economical and simple method for producing the valves.

The valves for opening and closing a flow channel in a lab-on-a-chip system are described below.

Advantageous configurations of the valve for opening and closing a flow channel in a lab-on-a-chip system, the method for actuating a valve and the method for producing a valve are described below.

The valve for opening and closing a flow channel in a lab-on-a-chip system includes a support body, which has at least one first recess in the form of a flow channel and has a second recess directly next to a subregion of the first recess. The second recess is at least partially filled with an elastomer, or an elastomer compound, which forms an elastomer body. In a first state, the elastomer compound and the support body together form boundary surfaces of the flow channel in the one subregion of the first recess. In a second state, the elastomer compound is deformed under the effect of pressure in such a way that a cross section of the flow channel in the first recess is filled, in particular fully. The flow channel is closed in the second state.

The structure of the valve includes only two bodies in the simplest case: the first support body and the elastomer compound. This simple structure leads to a reliable functionality and economical production. The valve can be reversibly closed by pressure on the elastomer compound, and reopened by relaxing the pressure. The structure of the valve contains no wearing parts, which leads to a reliable functionality over a longer time even with frequent use.

The support body may be a comparatively hard plastic material, in particular polycarbonate or polypropylene. The elastomer, or elastomer compound, may be a thermoplastic elastomer, in particular rubber or a mixture of polypropylene and ethylene propylene diene M-class elastomer (Santoprene®). This makes the support body and the elastomer compound substantially chemically stable in relation to substances which are used in biochemical analyses. The biochemical analyses are not vitiated by these materials, since in general they do not react with the biochemical substances. In contrast to metals, they are inert in relation to solvents such as water or alcohols, and do not modify biochemical substances such as for example peptides, DNA or antibodies.

The first and second recesses, and therefore the flow channel, are covered in a liquid-tight and/or gas-tight fashion with the aid of a film, in particular a self-adhesive film. This allows particularly simple production of the valve and, for example, dry reagents can straightforwardly be introduced into the flow channels after they have been produced. Application of the self-adhesive film is a simple and economical process, and leads to complete sealing of the flow channels and reaction chambers in the support body from the surroundings. Contamination or breaking of the sterility of the recesses in the support body during storage and transport before use are avoided.

One particularly simple and standardizable form of the support body is the form of a flat chip card. A range of laboratory devices can read out and use chip cards as lab-on-a-chip systems.

A lab-on-a-chip system which is particularly simple to produce and use is provided by a chip card which includes the first and second recesses on a front side, these being open toward the front side, and is fully covered in a liquid-tight and/or gas-tight fashion on this front side with a film, in particular a self-adhesive film. This combines the above-described advantages of the chip card and the film sealing of a front side having recesses such as reaction chambers and flow channels.

The first and/or the second recess may have a cross-sectional diameter in the range of millimeters or micrometers. The cross section of the first recess may in this case have an aspect ratio, i.e. in the case of a rectangular cross section a ratio of height to width, of more than 1. This provides a compact structure in microform, and the valves can be fitted easily on known chip cards. The aspect ratio of more than 1 ensures reliable closure of the valve in response to pressure on the elastomer compound, since the elastomer compound therefore does not require great deformation in order to close the flow channel. When the aspect ratio is greater, the valve can be closed commensurately more easily and with less pressure. A small deformation of the elastomer compound into the first recess is then sufficient to close the valve.

The flow channel may have an indentation in the one subregion of the first recess. Therefore, if the flow channel is narrowed in this subregion by the elastomer compound of the valve in the open state, which leads to simpler closure upon actuation of the valve, the cross-sectional area of the flow channel can be kept equal to that in a region outside the subregion of the valve. The flow speed in the region of the valve, with the valve open, thus remains equal to that in the rest of the flow channel, assuming a uniform flow channel width and height in the support body. This avoids any constriction for the liquid in the channel at the position of the valve.

The second recess may have the shape of a cylinder with rim, a rim elevation being formed on the outer circumference of the rim. With this special shape of the second recess, filled with elastomer compound, the elastomer compound is therefore anchored well, i.e. stably, in the support body. When the valve is actuated by pressure on the elastomer compound, the elastomer compound is not simply pressed out of the support body. A particularly stable valve is obtained.

In the method for actuating a valve as described above, a pressure force is exerted on the elastomer compound. The elastomer compound is deformed and at least the first recess is filled, in particular fully, by the deformation along the cross section of the flow channel. The flow channel is thereby closed in a liquid-tight and/or gas-tight fashion. In the absence of a pressure force the elastomer compound essentially returns to its original shape, the flow channel being opened.

The pressure force may be exerted with the aid of a plunger. This provides a simple structure and a particularly simple way of exerting the pressure force on the elastomer compound. The plunger may be located in an external unit, in which the reader unit for a sensor chip may also be arranged. The mechanics for activating the plunger, and the plunger itself, are therefore separate from the support body and, in the case of a disposable support body with valves, can be reused for a plurality of examinations.

If the support body with its recesses, and therefore the valve, are sealed by a film, then the pressure force may be transmitted indirectly onto the elastomer compound by the film.

The support body may be fastened by flat clamping on two opposite sides. In this case, the pressure force is exerted on the elastomer compound from the side which lies opposite the side with the first recess and the second recess. This permits fixed clamping of the support body with valves, for example in a reader unit which can reliably operate the valves without the support body slipping, and can thus control the chemical and fluidic processes in the support body.

The pressure force may be exerted on the elastomer compound in a first direction, which may be essentially perpendicular to the rear side of the support body. The elastomer compound may be deformed essentially along a second direction along the cross section of the flow channel. In the illustrate embodiment, the second direction is essentially perpendicular to the first direction and in particular essentially parallel to the rear side of the support body. "Essentially perpendicular" means that the two directions make an angle of 90°, although the angles may also be 90° plus/minus 10°. Angles other than 90° plus/minus 10° are also possible, what is essential being that the two directions are not parallel and the angle is therefore not equal to 0°.

The deformation of the elastomer compound is a consequence of the pressure force. Better functionality of the valve can be ensured by an angle between the direction of the pressure force in the direction of the deformation. A structure of the valve which prevents the elastomer compound from being pressed out of the support body under the action of pressure is thus readily possible. Furthermore, particularly with an adhesive layer on the front side of the support body in contact with the elastomer compound, the effect of the adhesive layer leading to incompletely reversible deformation of the elastomer compound is minimized. The elastomer compound bonds to the adhesive layer and, when the pressure force is relaxed, this means that the elastomer compound does not fully return to its original shape and does not fully free the first recess of the flow channel again, i.e. it does not fully open the valve. By an angle of 90° between the direction of the pressure force and the direction of the deformation and a large aspect ratio of the first recess of the flow channel, there being only a small common interface between the adhesive layer and the first recess, the contact area between the elastomer compound and the adhesive layer is minimized, particularly in the closed state of the valve. The effect of the plastic deformation of the elastomer compound by bonding to the adhesive layer is thus minimized. The flow channel, or the first recess, is freed almost fully when the pressure force on the elastomer compound is relaxed, and the valve is opened well.

A simple and inexpensive method for producing the support body is obtained if it is produced with the first recess and the second recess by injection molding technology. This allows rapid mass production in which the support body and the recesses are produced simultaneously, in one step. The elastomer compound may in this case be introduced into the second recess by injection molding technology. The first and second recesses may be covered in a liquid-tight fashion by applying a self-adhesive film.

The advantages associated with the method for actuating a valve and with the method for producing a valve are similar to the advantages which were described above in relation to the valve.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 is a schematic sectional view of the structure of a valve,

FIGS. 2A and 2B are sectional views of the valve shown in FIG. 1 in the open state and in the closed state, respectively, and FIGS. 3A-3C are a plan and two sectional views of the special structure of the valve according to one embodiment along the section line A-A' and along the section line B-B' in FIG. 3A.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

The valve shown in FIG. 1 is constructed from a substrate or support body 1 and an elastomer compound 2. The support body 1 may have the form of a chip card, in which case an electrochemical sensor array for the detection of biochemical substances may be arranged on the embedded chip. For the sake of simplicity, the configuration of the chip card will not be discussed in further detail here.

A first recess 4 is formed in the support body 1. The first recess 4 is open toward a front side 10 of the support body 1. It has the shape of a channel and is used as a flow channel 4'. Liquids or gases can flow through the flow channel 4'. A second recess 3 is formed in direct proximity to the first recess 4, adjacent to the flow channel. It has a common interface with the first recess 4, in a subregion 9 of the first recess 4. The second recess 3 is, as shown in FIG. 1, formed continuously from the front side 10 to the rear side 11 of the support body 1. It is fully filled, or occupied, with the elastomer compound 2.

A self-adhesive film 5 is applied flat on the front side 10 of the support body 1. The adhesive layer 6 of the self-adhesive film 5 ensures good adhesion of the film 5 on the support body 1 and on the elastomer compound 2. The film 5 with its adhesive layer 6, in conjunction with the support body 1 and the elastomer compound 2, seals the flow channel 4 from the surroundings in an air- or gas-tight and/or liquid-tight fashion.

In FIG. 2, the support body 1 shown in FIG. 1 is fastened in a sandwich fashion in a reader unit 7. Parts of the reader unit 7 are pressed against the front side 10 and against the rear side 11 of the support body 1. The support body 1 is thereby mounted immobile in the reader unit 7. If the support body 1 is configured in the form of a chip card, then the reader unit 7 can read out and process signals of the sensor array. The valve can be actuated by the reader unit 7 in order to control fluidic processes and chemical reactions in the first recess 4 of the support body 1. If, for example, two valves which have a common first recess 4 are arranged at different positions in the support body 1, then this first recess 4 can be closed in a liquid-tight and/or gas-tight fashion by simultaneous actuation of the two valves. This creates a sealed reaction space in which chemical reactions can take place.

By way of example, a valve is represented in FIG. 2 in a state I before and a state II during/after its actuation. A plunger 8, which is arranged for example in the reader unit 7 and is controlled by the latter, exerts a pressure force from the rear side 11 on the elastomer compound 2. This may be done on the one hand by moving the plunger 8 in the direction of the elastomer compound 2, or alternatively the plunger 8 is arranged stationary and the support body 1 with the elastomer compound 2 is moved in the direction of the plunger 8. The pressure force, which is exerted by the plunger 8 on the elastomer compound 2, causes deformation of the elastomer. Since the elastomer of the elastomer compound 2 can only expand in the direction of the first recess 4, it is pressed into the first recess 4. This continues until the first recess 4 is fully filled with elastomer compound 2 along a cross section of the first recess 4. This in turn causes the valve to be closed.

If the plunger 8 is moved away from the elastomer compound 2, then less to no pressure force acts on the elastomer compound 2 so that the elastomer compound 2 returns to its original shape. The elastomer compound 2 is retracted from the first recess and therefore releases it. The valve is opened again.

For actuation of a plurality of valves, the plungers 8 can be moved individually and successively, or for simultaneous actuation of the valves the plungers 8 may be fastened on a fixed plate and simultaneous actuation may be carried out by moving the support body 1 with the elastomer compound 2.

FIG. 3 represents a special embodiment of the valve in plan view and as sectional representations along the line A-A' and along the line B-B'. The second recess 3, which is filled with elastomer compound 2, has the shape of a cylinder with a rim, a rim elevation being formed on the outer circumference of the rim. The flow channel, or the first recess 4, is represented schematically in the form of a rectangular indentation in the surface of the front side 10. FIG. 3 only shows the section of the support body 1 in which a valve is formed. A series of such valves and different flow channels 4' may be arranged in a chip card, in which case a flow channel 4' may extend over wide regions of the support body 1 and have different shapes.

The special form of the second recess 3 filled with elastomer compound 2 provides good anchoring and good holding even when pressure acts on the elastomer compound 2 in the support body 1. When the valve is actuated, the elastomer compound 2 therefore cannot easily be pressed out of the support body 1. It is arranged stably in the support body 1 even when the valve is used repeatedly. In particular, that part of the second recess 3 which is formed in the shape of a rim, and which projects with its elevation from the rear side 11 into the support body 1, provides the elastomer compound 2 with holding and stability. When a pressure force is exerted with the aid of a plunger 8 from the rear side 11, the elastomer compound 2 cannot be pressed out of the support body 1 on the front side 10.

As can be seen in the plan view, the cylindrically shaped second recess 3 with the elastomer compound 2 projects over half of its diameter into the flow channel 4'. The diameter of the flow channel 4' is therefore narrowed in the subregion 9 in which the elastomer compound 2 is arranged. When a pressure force is exerted, and the valve is therefore actuated, the elastomer compound 2 needs to expand only slightly into the first recess 4 in order to fully close the flow channel 4'. In order to actuate the valve, a smaller pressure force is therefore required than if the elastomer compound 2 in the relaxed state had been arranged entirely outside the flow channel 4'.

By narrowing the flow channel 4' in the region of the elastomer compound 2, a liquid or a gas would stagnate at this position, or its flow speed would increase greatly at this position. In order to prevent this, as represented in the sectional representation along the line A-A', an indentation of the flow channel 4', as seen from the front side 10, is formed in the support body 1. By virtue of the indentation, the cross-sectional area of the flow channel 4' is equal everywhere in the region of the valve, so that stagnation or the increase in the flow speed of a liquid or a gas in the region of the elastomer compound 2, or the second recess 3, can be prevented.

In order for the valve to be usable in biochemical devices, the materials which come in contact with the liquids or gases must be compatible with the substances to be examined. Liquids used in biochemical examinations are for example blood, urine, water, alcohols or other solvents. Substances which, for example, are intended to be analyzed or detected by biochemical devices are for example proteins, DNA or antibodies. These must not be influenced or modified by the materials used.

Possible materials to be used for the support body 1 are hard polymers, which for the sake of simple production should be processable by injection molding technology. The material should be plastic, i.e. difficult to deform or undeformable. Such materials are provided, for example, by polycarbonate or polypropylene. In a prefabricated mold, the support body 1 of a chip card would be produced with its first recess 4 and second recess 3 in one operation by injection molding technology. In a second operation, the elastomer compound 2 would be introduced into the second recess by injection molding technology. Thermoplastic elastomers, in particular, are suitable as possible materials for the elastomer compound 2. One example of a particularly highly suitable thermoplastic elastomer is a mixture of polypropylene and ethylene propylene diene M-class elastomer, which is known by the brand name Santoprene®.

A chip with a sensor array can be inserted from the rear side 11 into the support body 1, which can be contacted and read out from the rear side by a reader unit 7. The front side of the support body 1, on which the flow channels 4' and reaction chambers are arranged, may be fully covered in a sterile fashion with the aid of a self-adhesive film. This provides gas- and liquid-tight flow channels 4' and reaction chambers. One possible material for a film is polyethylene. It is, however, also possible to use other film materials.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A valve for opening and closing a flow channel in a lab-on-a-chip system, comprising:
   a support body having at least one first recess forming a flow channel and a second recess directly next to a subregion of the at least one first recess;
   an elastomer compound at least partially filling the second recess, the elastomer compound and the support body together forming boundary surfaces of the flow channel in the subregion of the at least one first recess in a first state, and the elastomer compound being deformed in a second state under pressure causing a cross section of the flow channel in the at least one first recess to be fully filled, so that the flow channel is closed; and
   a self-adhesive film covering the at least one first recess and the second recess in a liquid-tight and/or gas-tight fashion.

2. The valve as claimed in claim 1, wherein the support body consists of at least one of polycarbonate and polypropylene.

3. The valve as claimed in claim 1, wherein the elastomer compound is a thermoplastic elastomer formed of one of rubber and a mixture of polypropylene and ethylene propylene diene M-class elastomer.

4. The valve as claimed in claim 1, wherein the support body is configured as a flat chip card.

5. The valve as claimed in claim 4, wherein the at least one first recess and the second recess are formed in and open toward a front side of the flat chip card.

6. The valve as claimed in claim 5, wherein the at least one first recess and/or the second recess have a cross-sectional diameter of less than 10 millimeters.

7. The valve as claimed in claim 5, wherein the at least one first recess has an aspect ratio of the cross-sectional height to width of more than 1 so as to facilitate closure of the valve in response to pressure on the elastomer compound.

8. The valve as claimed in claim 5, wherein the flow channel has an indentation in the subregion of the at least one first recess.

9. The valve as claimed in claim 6, wherein the at least one first recess and/or the second recess have a cross-sectional diameter of less than 20 micrometers.

10. The valve as claimed in claim 8, wherein the second recess is a cylinder with rim, a rim elevation being formed on an outer circumference of the rim.

11. A method for actuating a valve, for opening and closing a flow channel in a lab-on-a-chip system, formed by a support body having at least one first recess forming a flow channel and a second recess directly next to a subregion of the at least one first recess and an elastomer compound at least partially filling the second recess, comprising:
    exerting a pressure force on the elastomer compound to deform the elastomer compound and fill the at least one first recess by deformation along a cross section of the flow channel so that the flow channel is closed in a liquid-tight and/or gas-tight fashion; and
    releasing the pressure force to cause the elastomer compound to substantially return to an original shape, thereby opening the flow channel,
    wherein said exerting of the pressure force is by movement of a plunger, and
    wherein the pressure force is transmitted indirectly onto the elastomer compound by a film.

12. The method as claimed in claim 11, wherein the support body is fastened by flat clamping on two opposite sides, and
    wherein the pressure force is exerted on the elastomer compound from a first side opposite the at least one first recess and the second recess.

13. The method as claimed in claim 12, wherein the pressure force is exerted on the elastomer compound in a first direction, substantially perpendicular to a rear side of the support body, and the elastomer compound is deformed substantially along a second direction along the cross section of the flow channel, the second direction being substantially perpendicular to the first direction and substantially parallel to the rear side of the support body.

14. A method for producing a valve for opening and closing a flow channel in a lab-on-a-chip system by exerting pressure causing deformation of an elastomer compound along a cross section of the flow channel thereby closing the flow channel in a liquid-tight and/or gas-tight fashion, and releasing the pressure to cause the elastomer compound to substantially return to an original shape, thereby opening the flow channel, comprising:
  using injection molding technology to produce a support body with at least one first recess forming the flow channel and a second recess directly next to a subregion of the at least one first recess, and
  applying a self-adhesive film covering the at least one first recess and the second recess in a liquid-tight fashion.

15. The method as claimed in claim 14, further comprising introducing the elastomer compound into the second recess by injection molding technology.

* * * * *